| United States Patent [19] | [11] 3,901,933 |
|---|---|
| Norton | [45] Aug. 26, 1975 |

[54] PRODUCTION OF NITRILES BY AMMOXIDATION

[75] Inventor: Richard V. Norton, Wilmington, Del.

[73] Assignee: Sun Research and Development Co., Marcus Hook, Pa.

[22] Filed: June 20, 1973

[21] Appl. No.: 371,907

[52] U.S. Cl.............. 260/465 C; 252/422; 252/461
[51] Int. Cl.$^2$....................................... C07C 120/14
[58] Field of Search ............................... 260/465 C

[56] References Cited
UNITED STATES PATENTS
2,496,661  2/1950  Denton .............................. 260/465
3,523,964  8/1970  Kober et al. ....................... 260/453

OTHER PUBLICATIONS
Tarama et al., Bull. Chem. Soc., Japan, Vol. 41, No. 12, pp. 2840–2845, (1968).

Primary Examiner—Elbert L. Roberts
Assistant Examiner—Dolph H. Torrence
Attorney, Agent, or Firm—George L. Church; Donald R. Johnson; Paul Lipsitz

[57] ABSTRACT

A process for improving the activity of a supported vanadium oxide catalyst used in the ammoxidation of aromatic hydrocarbons in a system where no oxygen is added, which comprises pretreating the catalyst under ammoxidation reaction conditions by contacting it with carbon monoxide. The invention also embodies the catalyst made by the process and an ammoxidation process using the improved catalyst.

5 Claims, No Drawings

PRODUCTION OF NITRILES BY AMMOXIDATION

The vapor phase ammoxidation of organic compounds to nitriles is well known and is exemplified by U.S. Pat. No. 2,463,457 (Denton assigned to Socony-Vacuum Oil Co., issued Mar. 1, 1949) and by U.S. Pat. No. 2,496,661 (Denton, assigned to Socony-Vacuum Oil Co., issued Feb. 7, 1950). This process is particularly useful for preparing nitriles of aromatic hydrocarbons, as for example, conversion of toluene to benzonitrile, xylenes to toluonitriles and phthalonitriles and the like, and is also of value generally for converting alkyl-substituted aliphatic, aromatic, alicyclic, and heterocyclic compounds to the corresponding nitriles.

In carrying out the process a catalyst is used and a preferred catalyst may be supported or unsupported oxide, salt or acid of a metal such as vanadium, molybdenum, tungsten or their mixture (see, for example, U.S. Pat. No. 2,496,661). In starting up the process the art teaches that the catalyst should be conditioned in order to have initial maximum catalytic efficiency and this is done by exposing it to ammonia, hydrogen, or both for a period of time, usually several minutes to several hours. Then, the process is started by passing the reactant stream composed of organic reactant, ammonia, and oxygen over the catalyst under reaction conditions. In some ammoxidation processes, oxygen is omitted from the reactant stream, but is provided in-situ by the high oxidation state oxide catalyst. In such systems supported vanadium oxides are particularly useful catalysts.

It has now been found that in the vapor phase ammoxidation of alkyl-substituted organic compounds where a vanadium oxide catalyst is used and where no oxygen is added to the system, the conversion to nitrile product can be increased and this is accomplished in accord with the invention by a catalyst pretreatment in which the catalyst is contacted under ammoxidation reaction conditions with carbon monoxide. The invention also embodies the improved catalyst obtained by the process and further embodies the ammoxidation process using the catalyst.

The catalyst pretreatment process of the invention may be carried out as a separate step in a reactor distinct from the ammoxidation reactor, but it is preferred to use the ammoxidation equipment for the catalyst pretreatment. Thus, in the preferred technique the ammoxidation reactor and attendant equipment are prepared in the usual way, the reactor being charged with untreated catalyst and otherwise prepared for start-up. Then the carbon monoxide is passed over the catalyst at reaction conditions which will be about 300° to about 600°C and at pressures ranging from atmospheric to about 100 psig. Alternatively, but less preferred, the carbon monoxide pretreatment of catalyst may be done in the presence of the hydrocarbon reactant, but this procedure may result in burn and loss of the hydrocarbon. Preferred treatment conditions will be about 400° to about 450°C at essentially atmospheric pressure. If the hydrocarbon reactant is present during treatment of the catalyst with CO, it is generally desirable to dilute the organic reactant with an inert gas such as helium, nitrogen, etc., but in order that catalyst conditioning be conducted in a reasonable time, the concentration of organic reactant in the mixture should be at least 1 to about 10% by volume. The amount of carbon monoxide passed over the catalyst must be controlled so that no more than 1 mole of CO is used per mole of the vanadium oxide present. The lower limit of the amount of CO which may effectively be used is about 0.1 mole per mole of vanadium oxide, but preferably from about 0.5 to about 0.8 moles of CO per mole of vanadium oxide will be used to produce a very effective catalyst.

The process of the invention, of course, is condusive to a continuously operating plant where recycle streams are employed. In such a plant several alternative procedures for catalyst pretreatment are possible. For example, in one technique the catalyst may first be contacted with intermediate products, e.g., with cyanotoluene where a phthalonitrile is the final product, and then followed by contact with carbon monoxide and then leading in the ammonia. In another procedure, the catalyst may be contacted with carbon monoxide, then with a fresh hydrocarbon feed stream (xylene) followed by recycle intermediate product (cyanotoluene) and then leading in the ammonia. In still another technique, the catalyst is pretreated with carbon monoxide and a recycle intermediate stream (cyanotoluene) premixed with make-up hydrocarbon (xylene) and then the ammonia is led into the system. Any one of these techniques will make the preconditioning of the catalyst operable on a continuous basis in the recycle streams of partially ammoxidized hydrocarbons.

It is to be understood that the ammoxidation reaction conditions will not be changed in any way from those normally used as disclosed in the numerous well known patent and literature references, including the patents mentioned above. It will also be understood that the process of the invention applies to both fresh and regenerated catalyst, regeneration of catalyst being conducted in the usual manner by passing oxygen (from air or other source) over it at elevated temperature. Likewise, the process is applicable to fixed bed and fluidized bed systems of operation. As indicated, the catalyst used will be a vanadium oxide, more particularly $V_2O_5$, and will be supported on any of the various catalyst supports normally used, e.g., alumina, silica, diatomaceous earth, corundum, and the like. It is also to be understood that the $V_2O_5$ may be mixed with other materials known to have catalytic ammoxidation activity as, for example, oxides of silica, molybdenum, tungsten, etc. Also, promoters may be incorporated in the catalyst (e.g., compounds of phosphorus, calcium, etc.) as is known in the art.

The organic reactants useful in the process may be selected from a wide variety of compounds and will preferably include alkyl-substituted aromatic compounds. Among preferred starting materials are the mono- and polyalkyl-substituted aromatic hydrocarbons of the benzene and naphthalene series such as toluene, the xylenes, $\alpha$-methylnaphthalene, polymethylnaphthalenes, monoalkyl and polyalkyl anthracenes, mesitylene, durene, and the like. The alkyl substituent may, of course, contain more than a single carbon atom and thus the corresponding ethyl and other lower alkyl substituents are also useful.

In order to more fully describe and illustrate the invention the following examples are given:

EXAMPLE 1

Catalyst A ($V_2O_5 \cdot CaO \cdot SiO_2$)

Vanadium pentoxide (115.5 g; 0.64 moles) and calcium oxide (62.4 g; 1.12 moles) are intimately mixed as powders with 53.1 g (0.884 moles of silica gel. A small quantity of water is added and the mixture is ground in a high speed blendor for 15 minutes. The excess water is evaporated to form a paste, the paste is put in pellet traps and heated in vacuum for two hours at 150°C. The pellets are then heat treated for 4 hours at 540°C in a stream of dry air.

Analysis: $V_2O_5$, 51.3%; CaO, 21.5%.

Catalyst B ($V_2O_5 \cdot TiO_2$)

Vanadium pentoxide (140 g, 0.769 moles) and titanium dioxide (anatase, 60 g, 0.75 moles) are mixed for fifteen minutes in a high shear blendor. A small amount of water is added and the pelletizing procedure of Catalyst A is carried out. The pellets are heat treated for 4 hours at 540°C in a stream of dry air.

A standard ammox reactor was employed which was loaded with the catalyst and a mixture of 8% by volume of CO in nitrogen was passed over the catalyst at 350°C. An exotherm to 400°C to 450°C was noted at which point ammoxidation was commenced by turning off the CO and turning on the hydrocarbon and ammonia feeds. The CO fed was about 0.8 mole of CO per mole of $V_2O_5$.

The following table indicates the results obtained when the above-described catalysts are used for ammoxidation with and without a carbon monoxide pretreatment.

ment is used. Also of significance is the lower formation of carbon oxides fromed when the pretreatment step of the invention is used.

Similar improved results are obtained when a 6% vanadium pentoxide catalyst supported on alumina is used and the aromatic hydrocarbon is 2,6-dimethylnaphthalene, the product being primarily 2,6-dicyanonaphthalene with about 15% of 2-methyl-6-cyanonaphthalene being formed (based on a 48% conversion).

The invention claimed is:

1. In the vapor phase ammoxidation of organic compounds to form nitriles where a reactant stream of ammonia and a lower alkyl substituted aromatic hydrocarbon is passed over a supported vanadium oxide catalyst in the absence of added oxygen, the improvement which comprises pretreating the catalyst under ammoxidation reaction conditions of about 300° to about 600°C. and at a pressure of from atmospheric to about 100 psig. with from about 0.1 to no more than 1 mole of carbon monoxide per mole of vanadium oxide catalyst before admitting the reactant stream to the reaction system, whereby the conversion to nitriles is significantly increased.

2. The process of claim 1 where the organic reactant is a mono- or polyalkyl-substituted aromatic hydrocarbon of the benzene and naphthalene series.

3. The process of claim 2 where the amount of carbon monoxide is from about 0.5 to about 0.8 moles per mole of catalyst.

4. The process of claim 3 where the organic reactant is p-xylene.

Ammoxidation of p-Xylene

| Example | Catalyst | Temp (°C) | Contact Time (sec.) | Mole Ratio $NH_3$/pX | Conversion % | $CO + CO_2$ | % Yield[2] $\phi CN$ | p-TN | TPN |
|---|---|---|---|---|---|---|---|---|---|
| I | A | 450 | 4 | 3:1 | 15 | 29.0 | 1.1 | 53.5 | 10.1 |
| Control[1] | A | | | | 11 | 52.4 | 1.9 | 42.2 | 3.5 |
| II | A | 450 | 8 | 3:1 | 25 | 30.0 | 1.1 | 50.7 | 19.5 |
| Control[1] | A | | | | 16 | 45.1 | 1.3 | 46.5 | 7.1 |
| III | A | 450 | 8 | 8:1 | 39 | 21.3 | 0.7 | 37.5 | 41.3 |
| Control[1] | A | | | | 31 | 31.0 | 1.0 | 46.5 | 20.8 |
| IV | B | 475 | 3 | 3:1 | 41 | 17.3 | 0.1 | 43.0 | 41.0 |
| Control[1] | B | 475 | 3 | 3:1 | 37 | 21.3 | 0.4 | 37.0 | 35.0 |
| V | B | 450 | 8 | 3:1 | 35 | 13.1 | 0.3 | 39.0 | 41.0 |
| Control[1] | B | 450 | 8 | 3:1 | 23 | 24.5 | 0.7 | 47.0 | 34.0 |

Legend: pX = p-Xylene; $\phi CN$ = Benzonitrile; p-TN = p-Toluonitrile; TPN = Terephthalonitrile
[1] No CO pretreatment
[2] Based on p-xylene converted As can be seen from the above data, in every case the CO treatment produces a higher TPN yield than does the control runs where no carbon monoxide pretreat- 5. The process of claim 3 where the organic reactant is 2,6-dimethylnaphthalene.

* * * * *